United States Patent
Ohnishi et al.

(10) Patent No.: US 7,418,338 B2
(45) Date of Patent: Aug. 26, 2008

(54) ROAD INFORMATION PROVISION SERVER, ROAD INFORMATION PROVISION SYSTEM, ROAD INFORMATION PROVISION METHOD, ROUTE SEARCH SERVER, ROUTE SEARCH SYSTEM, AND ROUTE SEARCH METHOD

(75) Inventors: Keisuke Ohnishi, Tokyo (JP); Shin Kikuchi, Tokyo (JP); Yusuke Suzuki, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 513 days.

(21) Appl. No.: 10/529,145

(22) PCT Filed: Dec. 18, 2003

(86) PCT No.: PCT/JP03/16243

§ 371 (c)(1),
(2), (4) Date: Jun. 23, 2005

(87) PCT Pub. No.: WO2004/059254

PCT Pub. Date: Jul. 15, 2004

(65) Prior Publication Data

US 2006/0031566 A1 Feb. 9, 2006

(51) Int. Cl.
*G06G 7/76* (2006.01)
*G01C 21/34* (2006.01)

(52) U.S. Cl. ........................... 701/117; 701/209
(58) Field of Classification Search ............... 70/200, 70/117–119, 213–215; 342/357.06, 357.12; 340/988; 701/117–119, 200, 213–215, 209
See application file for complete search history.

(56) References Cited

U.S. PATENT DOCUMENTS

| | | | | |
|---|---|---|---|---|
| 5,523,950 A | * | 6/1996 | Peterson | 455/456.5 |
| 5,610,821 A | * | 3/1997 | Gazis et al. | 455/456.5 |
| 5,818,356 A | * | 10/1998 | Schuessler | 340/995.12 |
| 6,253,146 B1 | * | 6/2001 | Hanson et al. | 701/202 |
| 6,480,783 B1 | * | 11/2002 | Myr | 701/117 |
| 6,615,130 B2 | * | 9/2003 | Myr | 701/117 |

FOREIGN PATENT DOCUMENTS

| | | |
|---|---|---|
| JP | 2000-67364 | 3/2000 |
| JP | 2000-067364 | 3/2000 |
| JP | 2001-141486 | 5/2001 |
| JP | 2001-175982 | 6/2001 |
| JP | 2001-356021 | 12/2001 |
| JP | 2002-073758 | 3/2002 |
| JP | 2002-82606 | 3/2002 |
| JP | 2002-082606 | 3/2002 |
| JP | 2002-257561 | 9/2002 |

\* cited by examiner

*Primary Examiner*—Yonel Beaulieu
(74) *Attorney, Agent, or Firm*—Westerman, Hattori, Daniels & Adrian, LLP.

(57) ABSTRACT

A road information provision system or route search system has a terminal device such as a car navigation device 20a, portable telephone 20b, or PC 20c which specifies routes and issues requests for road information; a VICS center 40 which provides congestion information; a road information provision/route search server 10 which, in response to requests from terminal devices 20a to 20c, generates road information based on congestion information from the VICS center 40, and provides the road information to the terminal devices 20a to 20c; a dedicated circuit network 50 which connects the road information provision server 10 and VICS center 40 by dedicated circuits; a network 30 which connects the terminal devices 20a to 20c and road information provision/route search server 10 to enable communication; and a GPS 60 which provides position information. The system can determine shortest-route information of distance or time and congestion information.

11 Claims, 12 Drawing Sheets

ROAD INFORMATION PROVISION SERVER, ROAD INFORMATION PROVISION SYSTEM, ROAD INFORMATION PROVISION METHOD, ROUTE SEARCH SERVER, ROUTE SEARCH SYSTEM, AND ROUTE SEARCH METHOD

TECHNICAL FIELD

This invention relates to a road information provision server, road information provision system, and road information provision method, which provide congestion information and other road information. In particular, this invention relates to a road information provision server, road information provision system, and road information provision method capable of providing accurate road information rapidly for all legs of a trip, even when a route is specified over a broad range (a long-distance interval).

Further, this invention relates to a route search server, route search system, and route search method to provide route information for a desired interval. In particular, this invention relates to a route search server, route search system, and route search method capable of performing route searches for each search request and of providing the same route information results upon repeating a search for the same interval.

BACKGROUND ART

In the prior art, such information as the beginning position and ending position of a congested road interval, the total length of the interval, and the time required to traverse the congested interval from the end to the beginning, has been provided as congestion information to the drivers of automobiles by means of radio broadcasts, photoelectric billboards installed along major arteries, and in addition by means of navigation equipment installed in automobiles.

In recent years in particular, systems (for example, the Vehicle Information and Communication System (VICS) for communication of road traffic information) have been introduced in which vehicle detectors and similar which detect traveling vehicles are installed on roadsides, and the information obtained from such vehicle detectors is analyzed at a center to calculate congested intervals and other information. Drivers can reliably obtain detailed congestion information, such as the beginning position and total length of a congested interval, from such a system.

For example, Japanese Patent Laid-open No. 2002-257561 discloses a congestion information provision system and congestion information provision equipment. In this congestion information provision system, such information as the number of vehicles in transit on each road and the vehicle velocity of vehicles in transit is acquired, and based on this traffic information, the beginning position of a congested interval, the congestion length and other information is calculated, and this traffic information is transmitted by wireless means to users. One such congestion information provision system is the Vehicle Information and Communication System (VICS), in which traffic information is transmitted to users from optical beacons, radio beacons, FM multiplex broadcast antennas, and similar.

As traffic information transmitted to users, in addition to construction information indicating the locations of construction sites, accident information indicating the locations of accident sites, road closure information indicating road closures, and similar, there is also common congestion information, necessary to provide individual congestion information (described below) to users. In particular, this common congestion information comprises such information as road numbers which can specify roads in which congestion has occurred for navigation equipment, the beginning and ending positions of congestion, and congestion quantities (for example, congestion lengths).

On the other hand, in order to receive traffic information provided by the congestion information provision system, user vehicles are equipped with navigation equipment comprising the functions of congestion information provision devices. Here, congestion information provision devices are configured so as to receive traffic information provided by a congestion information provision system via a receiving antenna. As this reception portion, for example, an optical beacon receiver or radio beacon receiver which receives traffic information transmitted from the Vehicle Information and Communication System (VICS) to vehicles, as well as an FM receiver which receives traffic information transmitted to vehicles via FM multiplexed broadcasts, may be used.

Thus by means of conventional congestion information provision system and congestion information provision device, through the reception, by a navigation device comprising functions of a congestion information provision device, of traffic information comprising information on a congested interval through which the vehicle itself is passing from the Vehicle Information and Communication System (VICS), congestion information for individual vehicles can be provided to drivers.

Further, Japanese Patent Laid-open No. 2002-73758 discloses an information provision system which performs route searches. In this information provision system, a management server of the information provision system receives a search request for a route, from a departure point to a destination point, from a terminal over the Internet, performs route search processing, and transmits the search result to the terminal. The management server searches public transportation facilities and performs a route search for movement using public transportation facilities, searches road network information and taxi position information and performs a route search for movement using a taxi, searches road network information and performs a route search for movement using an automobile, and searches pedestrian road information and performs a route search for movement on foot, and combines these search results, to perform a route search from the departure point to the destination point.

By this means, a route search can be performed which combines movement using transportation facilities and movement on foot, based on the search conditions, and this search result can be transmitted to a terminal.

DISCLOSURE OF THE INVENTION

However, there is the problem that, using the congestion information provision system and congestion information provision device of the prior art described in Japanese Patent Laid-open No. 2002-257561, congestion information is transmitted from the Vehicle Information and Communication System (VICS) by FM multiplexed broadcasts or similar, and these are received by vehicles, so that users can only obtain congestion information for vehicle areas which are reached by the FM radio waves.

Consequently, broad-range congestion information cannot be obtained, and so there is the problem that in navigation over long distances, the actual shortest route cannot be accurately determined.

Hence one object of this invention is to provide a road information provision server, road information provision system, and congestion information provision method which, in searching for routes over long distances, can accurately and quickly determine shortest-route information, in terms of distance or of time, and can accurately and quickly determine congestion information for all legs of a route.

Further, using an information provision system such as that described in Japanese Patent Laid-open No. 2002-73758, search results are managed by a management server separately for each user, in order to response to repeated search requests from a terminal for the same route. In such cases, there is the problem that the load on the management server is increased, and additional costs are incurred.

As a method of resolving this problem, a route search may be performed by the management server upon each repeated search request from a terminal for the same route, and the results transmitted to the terminal. However, when route searches are performed for each such search request, there are cases in which the following problem may occur.

FIG. 11 and FIG. 12 show search results in a case in which searches are performed at different times for the same route in a conventional route search system. FIG. 11 shows the search result when a search from station A to the destination point is performed at 10:00. At this time, the route shown on the terminal can be displayed using text and a map. In the case of text display, intersections and similar become route guide points, so that as for example shown in FIG. 11, a display such as "station A→left at junction of three roads B→straight at intersection C→right at intersection D→left at intersection E→straight at junction of three roads F→destination" is possible.

On the other hand, when using a map display, if the terminal is a portable telephone or similar, the space of the display portion is limited, and it may be possible to display only a portion of the map. In such cases, in a map display the route from the current position (denoted by a star) is displayed (the displayable range is indicated by the dashed lines).

Here, when the user advances to the vicinity of intersection D, the range of the map display is exceeded, and so a repeated search (map redisplay) is performed from the terminal side. FIG. 12 shows the result of a route search from station A to the destination when the user is in the vicinity of intersection D. When the time of the search request to the server is different (the first search request is at 10:00 (FIG. 11), and this search request is at 10:05 (FIG. 12)), because of changes in congestion information and similar, the search route result may be different. The route in FIG. 12 (at time 10:05) is shown as "station A→left at junction of three roads B→right at intersection C→left at intersection G→straight at intersection E→straight at junction of three roads F→destination". On the other hand, the map information displayed on the terminal is based on the current position, so that the range indicated by the dashed lines in FIG. 12 is displayed. As a result, the user, in the vicinity of intersection D, is in a position removed from the specified route, and cannot obtain route information to the destination.

Hence an object of this invention is to provide a route search server, route search system, and congestion information provision method capable of providing the same route information without managing search results for each user on the server side, even in the case of repeated search requests for the same route at different times.

In order to resolve the above problems, a road information provision server for providing road congestion information, comprises basic road network storage means for storing road network information; congestion information storage means for storing congestion information; congestion information processing means for generating congested road network descriptions based on the road network information stored in the basic road network storage means and on congestion information stored in the congestion information storage means; congested road network description storage means for storing the congested road network descriptions generated by the congestion information processing means; and, information provision processing means for generating and providing road information for all legs of a route, based on route specification information specifying the route for searching, the congested road network descriptions stored by the congested road network description storage means, and the road network information stored by the basic road network storage means.

Further, in order to resolve the above problems, a road information provision system, comprises a terminal device for specifying routes and requests road information; a congestion information center for providing congestion information; and, a road information provision server for generating road information based on the congestion information from the congestion information center in response to a request from the terminal device, and providing the road information to the terminal device; and is characterized in that the road information provision server is the above-described road information provision server.

Further, in order to resolve the above problems, a road information provision method of providing road information for specified routes, the method comprises the steps of: (A) the basic distance $L0(i)$ and type of each unit route (i), as well as the average velocity v for each route type, are stored as road network information; (B) congestion information is obtained and stored; (C) a congested road network description is generated and stored, based on the road network information and on the congestion information; (D) in response to a request accompanied by a route specification, the course and time for the shortest route, in terms of either distance or of time, are calculated based on the congested road network description for the specified route, the distance of the shortest route is calculated based on the road network information, and the course, distance and time of the shortest route are generated as road information; and, (E) the generated road information is provided.

Further, in order to resolve the above problems, a route search server for performing road route searches, comprises basic road network storage means for storing road network information; congestion information storage means for storing congestion information; congestion information processing means for generating congested road network descriptions with prescribed timing based on the road network information stored in the basic road network storage means and on congestion information stored in the congestion information storage means; congested road network description storage means for storing the latest congested road network description among the congested road network descriptions generated by the congestion information processing means; historical congested road network description storage means for storing past congested road network descriptions among the congested road network descriptions generated by the congestion information processing means; and, information provision processing means for generating route information by searching road routes from the congested road network descriptions stored by the congested road network description storage means or by the historical congested road network description storage means and from the road network information stored by the basic road network storage means based on route specification information, and providing the route information; and is characterized in that the route information includes time information indicating the time of generation of the route information, and, when the time information is included by the route specification information, the information provision processing means selects the congested road network description at the time indicated by the time information from the congested road network description storage means or from the historical congested road network description storage means, and performs a road route search from the selected congested road network description and from the road network information stored in the basic road network storage means.

Further, in order to resolve the above problems, a route search system, comprises a terminal device for specifying routes and requests road information; a congestion information center for providing congestion information; and, a route search server for generating route information based on the congestion information from the congestion information center in response to a request from the terminal device and providing the route information to the terminal device; and is characterized in that the route search server is the above-described route search server.

Further, in order to resolve the above problems, a route search method of providing route information for a specified route, the method comprises the steps of: (A) storing the basic distance $L0(i)$ and type of each unit route (i), as well as the average velocity v for each route type, as road network information; (B) obtaining and storing congestion information with prescribed timing; (C) generating the latest congested road network description based on the road network information and on the congestion information, with the same or different timing as step (B); (D) storing currently stored congested road network descriptions as historical congested road network descriptions, and updating by the latest congested road network description; (E) calculating the course and time based on the latest congested road network description or the historical congested road network descriptions in response to a route search request, and calculating the distance of the course based on the calculated course and on the road network information, and generating the course, distance and time as route information; and, (F) adding time information indicating the time at which the route information was generated to the generated route information, and providing the route information.

Here, when the travel time t(i) on each unit route (i) is used as the congestion information, the congestion distance L(i) for each unit route (i) comprised by the congested road network description can be calculated, using the average velocity v for each type of route, employing the equation $$L(i)=v \cdot t(i) \qquad (1)$$

to generate the congested road network description.

As congestion information, congestion and/or traffic slowdown in each of the unit routes (i) as well as the distance x and/or y of each may be used to calculate the congestion distance (i) for each unit route (i) comprised by a congested road network description, based on the basic distance $L0(i)$ for each unit route (i) of road network information and the congestion information, using the equation $$L(i)=(L0(i)-x-y)+\alpha x+\beta y \qquad (2)$$

where α is a weighting factor (>1) for congestion, and β is a weighting factor (>1) for traffic slowdowns, to generate a congested road network description.

Because congestion information can be collected and managed in a unified manner, congested road network descriptions can be generated for all roads, and in response to user requests, road information can be generated for the relevant (specified) route based on such congested road network descriptions, so that shortest-route information, in terms of both distance and time, as well as congestion information and other road information can be determined accurately and rapidly, even for routes specified (by specifying the starting position and ending position, or similar) over broad ranges (long-distance intervals).

Further, by adding time information at the time of generation of route information to the route information of search results, route information at the time in question can be obtained when repeating a search of the same route, so that the same route information can be provided even when search requests for the same route are repeated at different times, without managing search results by users on the server side.

BEST MODE FOR CARRYING OUT THE INVENTION

Figure 1:
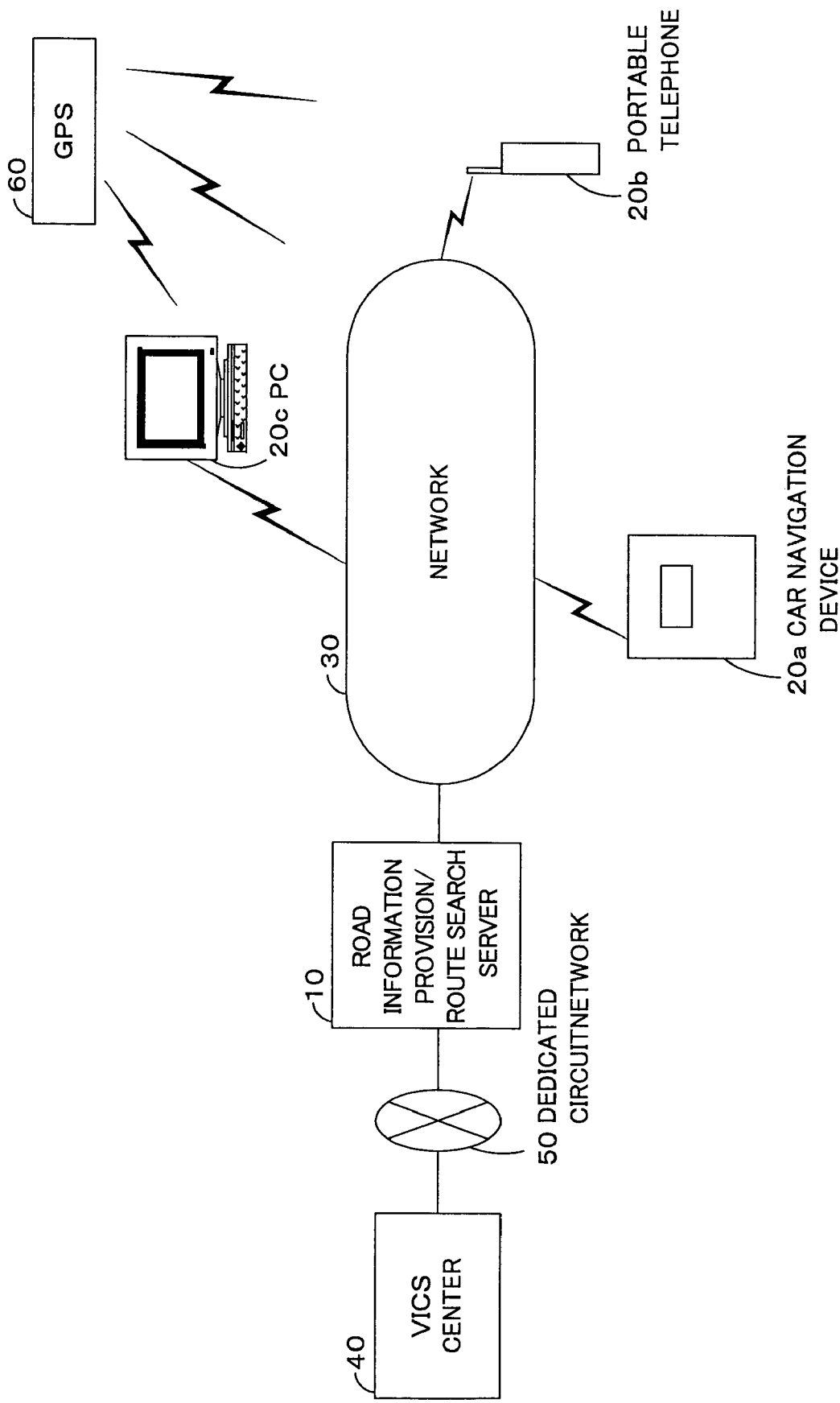
FIG. 1 shows one example of a mode of use of a road information provision system or route search system of this invention.

Below, aspects of a road information provision server, road information provision system, and road information provision method of this invention, as well as a route search server, route search system, and route search method of this invention are explained, referring to the drawings.

Of course the scope of this invention is not limited to these aspects.

FIG. 1 shows one example of a mode of use of a road information provision system or route search system of this invention. In FIG. 1, the road information provision system comprises a car navigation device 20a which specifies routes and requests road information; a portable telephone 20b, PC (Personal Computer) 20c or other terminal device; a Vehicle Information and Communication System (VICS) or other congestion information center (hereafter simply called a "VICS center") 40 which provides congestion information; a road information provision/route search server 10, which, in response to requests from terminal devices 20a to 20c, generates road information based on congestion information from the VICS center 40 and provides the road information to the terminal devices 20a to 20c; a dedicated circuit network 50, which connects the road information provision/route search server 10 and the VICS center 40; a network 30, which connects the terminal devices 20a to 20c with the road information provision/route search server 10 to enable communication; and a GPS (Global Positioning System) 60, which provides position information.

Here, the terminals 20a to 20c can be made to obtain current position information from the GPS 60, for use as the starting point of a specified route.

First, a road information provision server, road information provision system, and road information provision method of this invention are explained.

Figure 2:
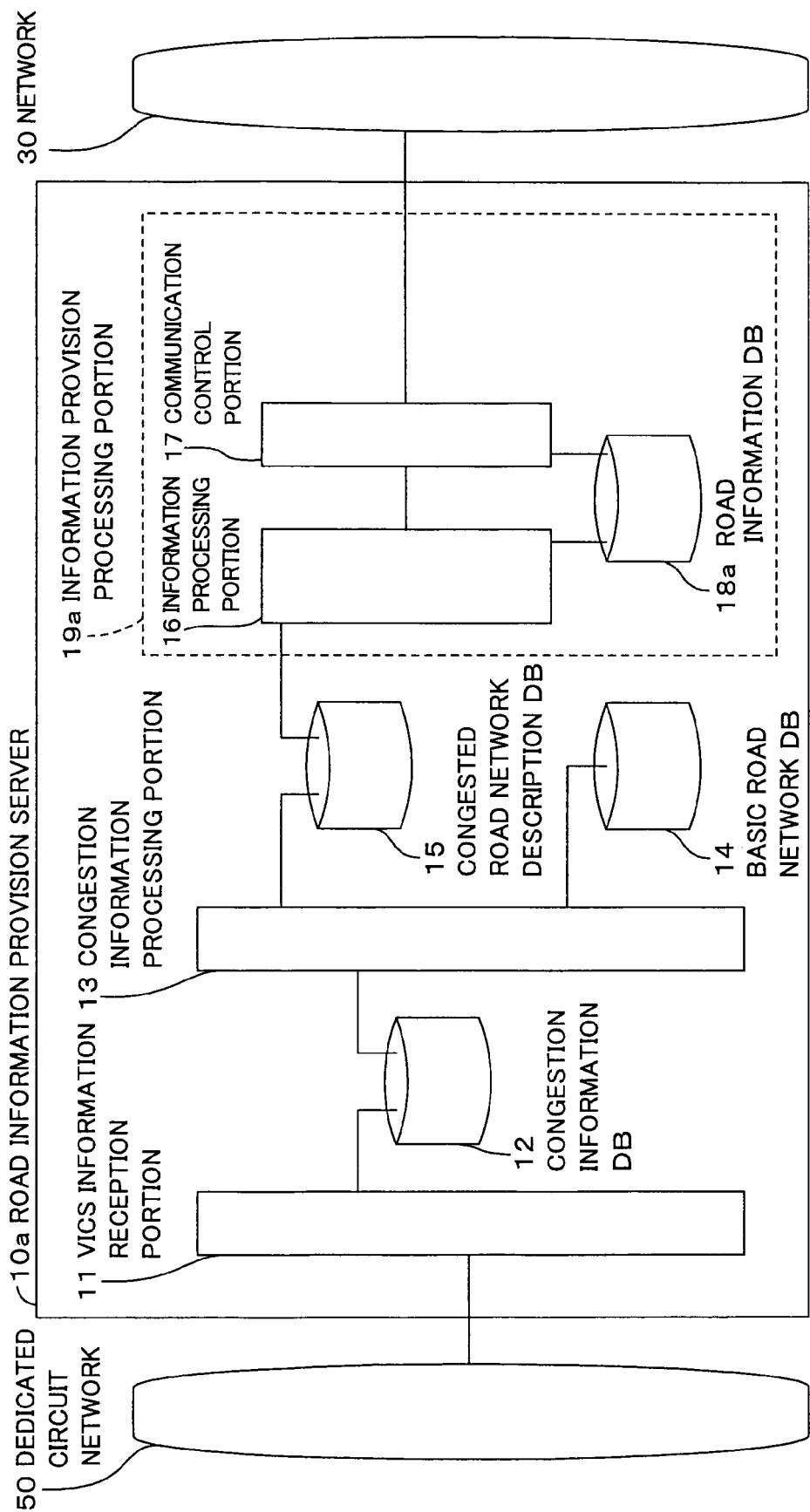
FIG. 2 shows one example of the form of a road information provision server of this invention.

FIG. 2 shows one example of the form of a road information provision server 10a of this invention. In FIG. 2, the road information provision server 10a comprises a VICS information reception portion 11, which receives congestion information via the dedicated circuit network 50 from the VICS center 40 (FIG. 1) with prescribed timing (for example, every 5 minutes0; a congestion information DB (database) 12, which stores congestion information received from the VICS information reception portion 11; a basic road network DB 14, which stores route types and basic distances L0($i$) for each prescribed unit route (i), average velocities v for each route type, and other read network information; a congestion information processing portion 13, which generates congested road network descriptions based on road network information stored in the basic road network DB 14 and on congestion information stored in the congestion information DB 12; a congested road network description DB 15, which stores congested road network descriptions generated by the congestion information processing portion 13; and, an information provision processing portion 19a, which, based on route information specifying routes for searching, generates and provides road information for all legs of a route from congested road network descriptions stored in the congested road network description DB 15 and from road network information stored in the basic road network DB 14.

Here, the information provision processing portion 19a comprises a communication control portion 17, which performs communication with the terminal devices 20a to 20c via the network 30; an information processing portion 16 which, based on route specification information received from the communication control portion 17, generates, as road information, the congestion distances (L(i)) of each unit route (i) of all legs from the congested road network descriptions stored in the congested road network description DB 15; and, a road information DB 18a, which stores road information generated by the information processing portion 16.

Further, the information provision processing portion 19a can also generate, as road information, shortest routes from congestion distances (L(i)) based on starting point position information and ending point position information specified by terminal devices 20a to 20c, as well as prediction times (required times, arrival times, and similar) for each of a plurality of routes, as road information.

Traffic information provided as congestion information by the Vehicle Information and Communication System (VICS), in addition to construction information indicating the locations of construction sites, accident information indicating the locations of accident sites, and closed-road information indicating closed roads, may also include common congestion information. In particular, this common congestion information comprises such information as road numbers enabling specification of roads on which congestion occurs, the starting and ending positions of congestion, and congestion amounts (for example, congestion lengths (x) and slowed traffic lengths (y), and travel times (t) for prescribed routes).

Next, an information provision method is explained which uses the road information provision system and road information provision server 10 shown in FIG. 1 and FIG. 2.

Figure 3:
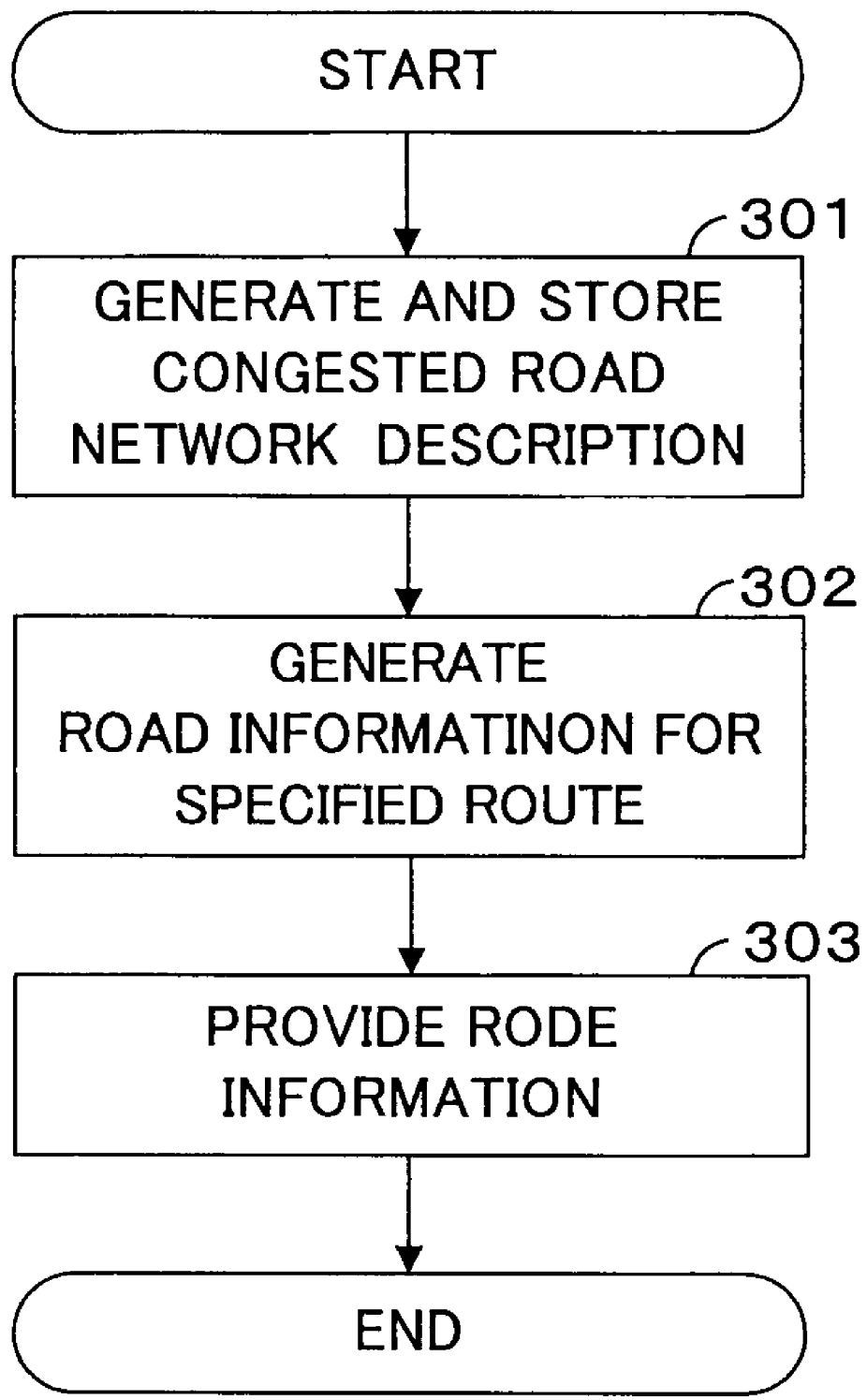
FIG. 3 is a flowchart showing a road information provision method of this invention.
Figure 4:
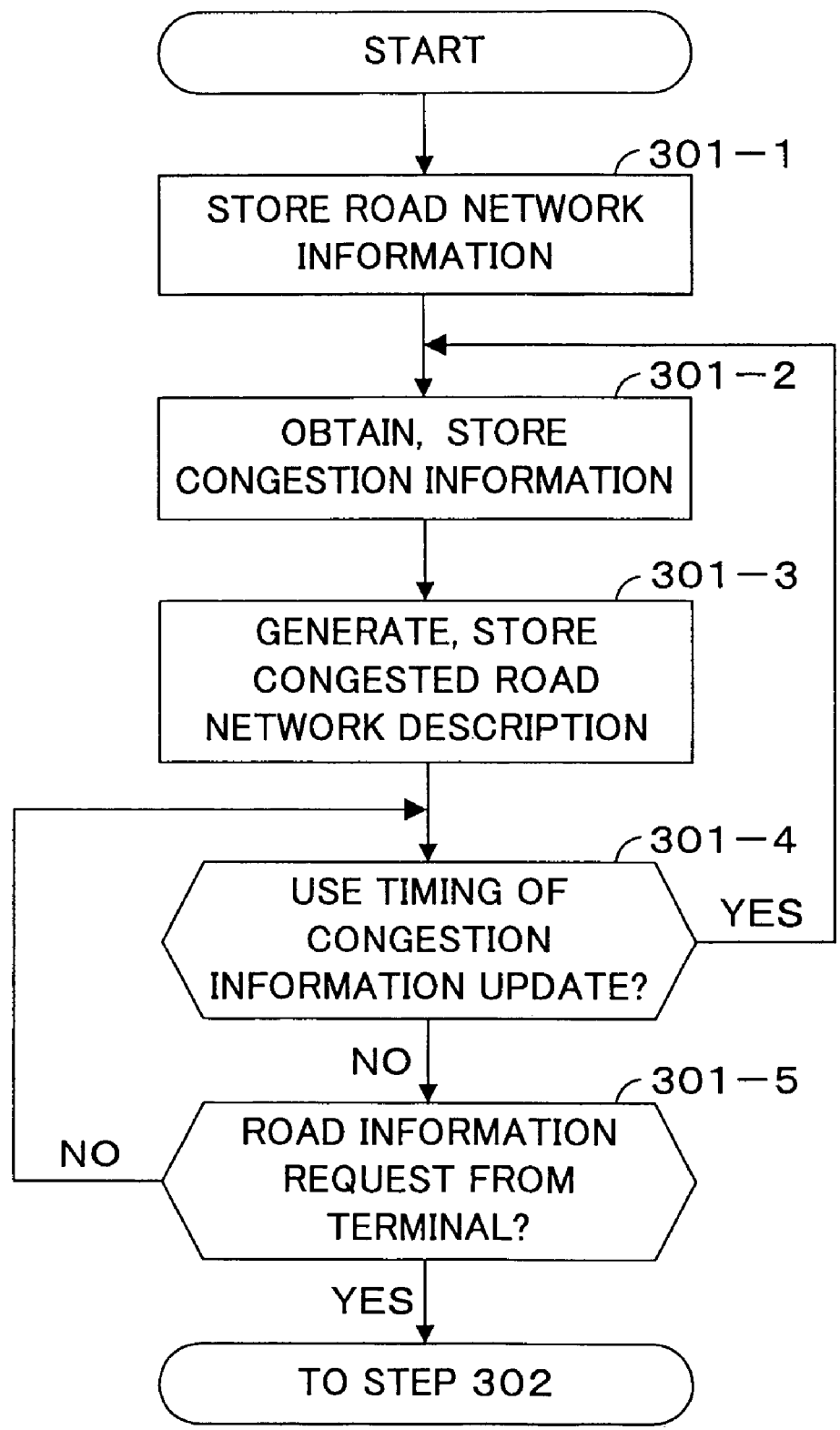
FIG. 4 is a flowchart showing a road information provision method of this invention.
Figure 5:
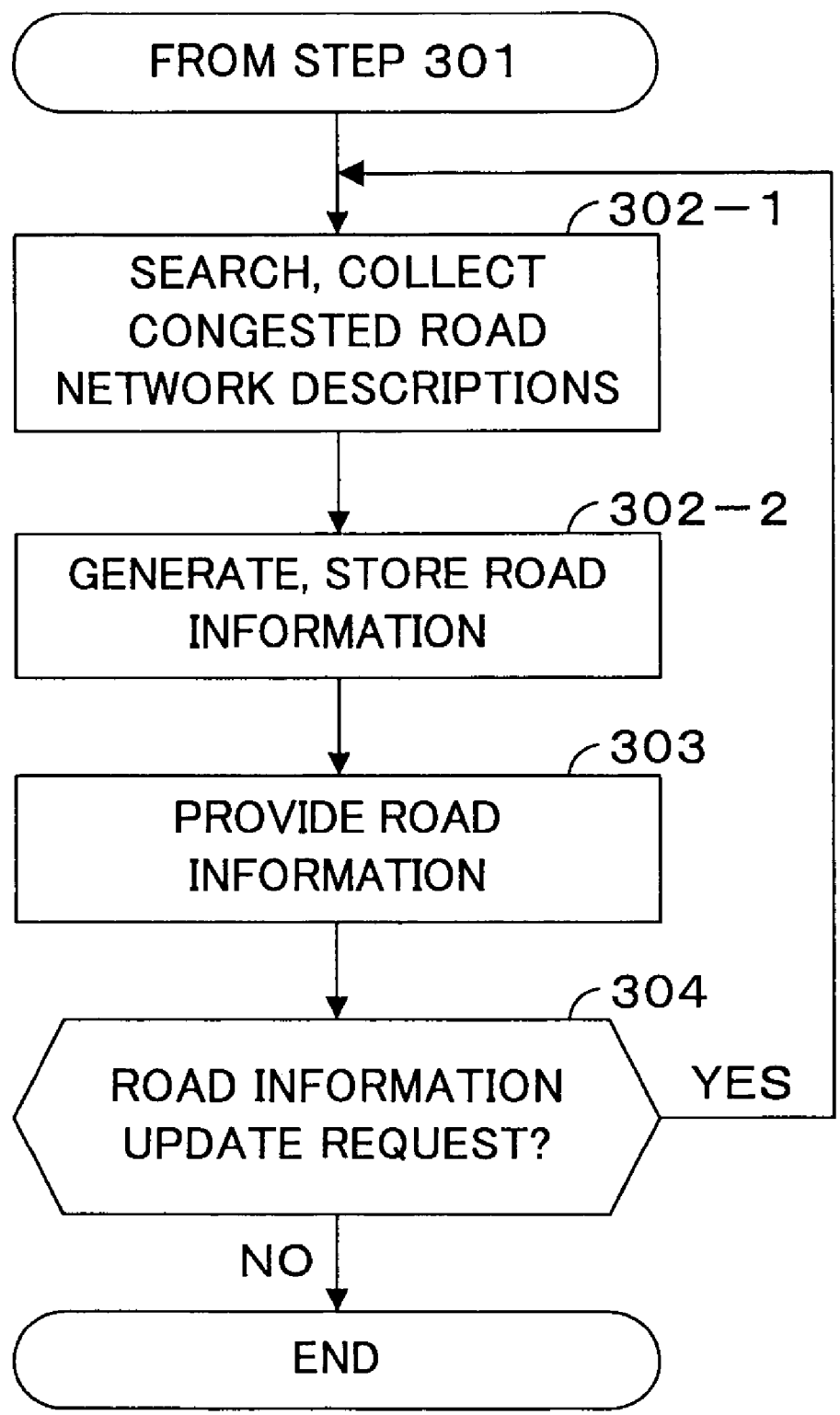
FIG. 5 is a flowchart showing a road information provision method of this invention.

FIG. 3 through FIG. 5 are flowcharts which indicate information provision methods using a road information provision system of this invention. In FIG. 1 through FIG. 5, an information provision method of this invention first generates congested road network descriptions by means of the congestion information processing portion 13, and stores these networks in a congested road network description DB 15 (step 301).

The details of step 301 are shown in FIG. 4. First, the road information provision server 10a stores road network information, including the basic distances L0($i$) and types of each unit route (i) as well as the average velocities v of each route type, in the basic road network DB 14 (step 301-1).

Then, congestion information (traffic information) is obtained from the VICS center 40 and stored in the congestion information DB 12 (step 301-2).

Next, the congestion information processing portion 13 generates a congested road network description based on the congestion information stored in the congestion information DB 12 and road network information stored in the basic road network DB 14, and stores this in the congested road information network DB 15 (step 301-3).

Here, the method of generation of a congested road network description is explained. When the travel time t(i) for each unit route (i) is included in the congestion information stored in step 301-2, the average velocities v determined by the route type (highway, ordinary national road, prefectural road, or similar) can be used in step 301-3 to calculate the congestion distances L(i) for each unit route (i), according to the equation $$L(i)=v\cdot t(i) \quad (1)$$

to generate the congested road network description.

When the congestion information stored in step 301-2 includes congestion and slowdown distances (congestion distances (x) and slowdown distances (y)) for each unit route (i), in step 301-3 the congestion distances L(i) for each unit route (i) comprised by a congested road network description can be calculated using the following equation, $$L(i)=(L0(i)-x-y)+\alpha x+\beta y \quad (2)$$

where α is a weighting factor (>1) for congestion, and β is a weighting factor (>1) for traffic slowdowns, to generate a congested road network description, based on the basic distances L0($i$) for each unit route (i) of the road network and on the congestion distances (x) and slowdown distances (y) in unit routes (i) comprised by the congestion information.

A congested road network description generated in this way is stored in the congested road network description DB 15 (step 301-3).

Here, step 301-2 and step 301-3 can be performed with prescribed timing (for example, in 5 minute intervals), and steps 301-2 and 301-3 are performed every time congestion information is updated (step 301-4).

When there is a request accompanied by route specification from a terminal device 20a to 20c (step 301-5), processing is performed to generate road information for the specified route (step 302). Here, the requested route specification comprises the departure point (starting position information), intermediate points, destination point (ending position information), use of toll roads, and similar.

FIG. 5 indicates in detail the processing of steps 302 and 303. In FIG. 3 and FIG. 5, when there is a request accompanied by a route specification (step 301-5 in FIG. 4), congested road network descriptions for the specified route are searched and collected (step 302-1).

Figure 6:
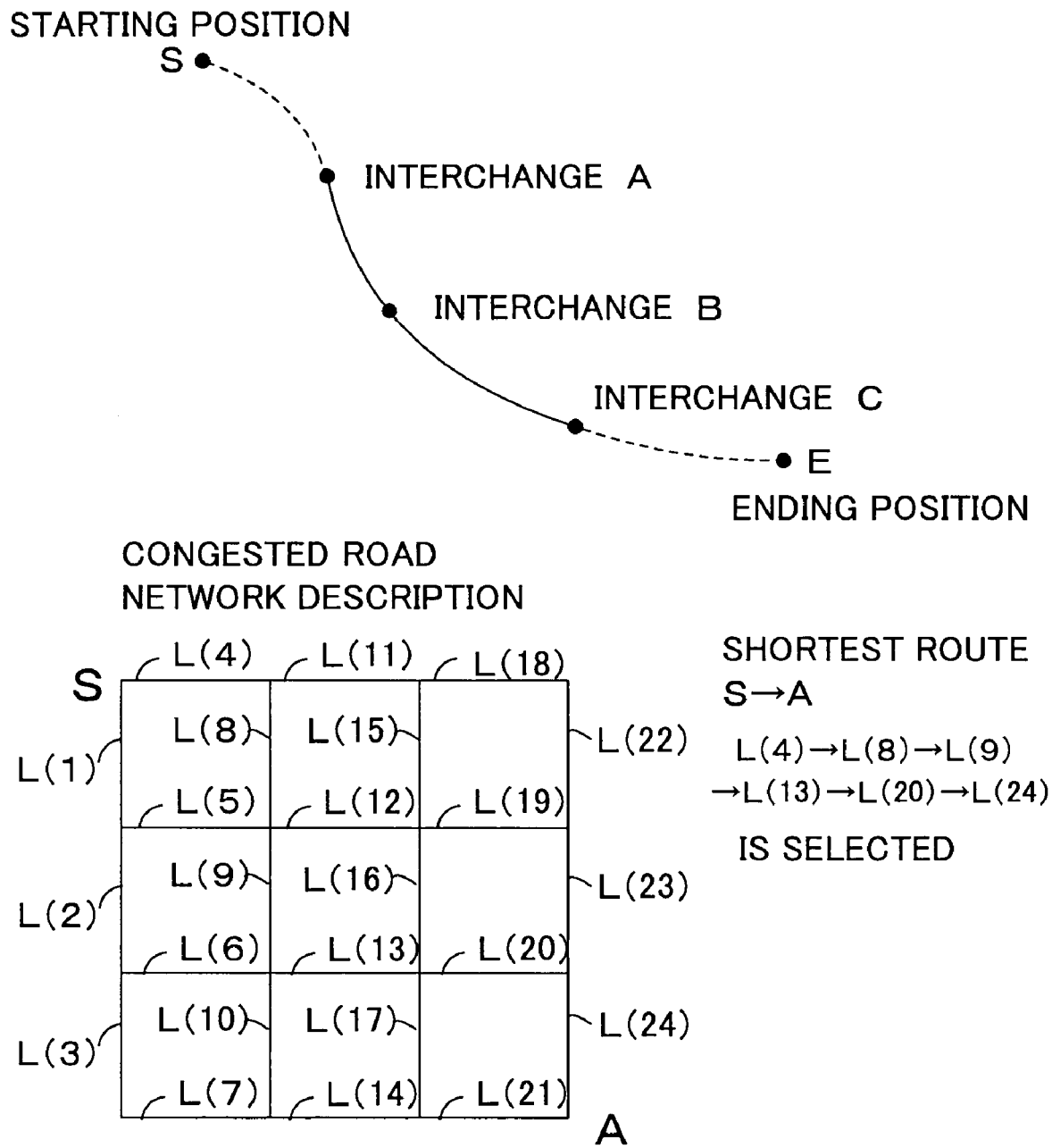
FIG. 6 shows an example of a case of searching routes from a specified starting point S to an ending point E.

FIG. 6 shows an example of a case of searching routes from a specified starting point S to an ending point E. As shown in FIG. 6, congestion distances L(i) are stored, for each prescribed unit route (i), in the congested road network description DB 15. In FIG. 6, in particular, the congested road network description from the starting position S to interchange A is shown. There are a plurality of routes from the starting position S to interchange A, but by comparing sums of L(i) from S to A, the shortest route (L(4)→L(8)→L(9)→L(13) →L(20)→L(24)) can be determined. Here, in comparisons of L(i), in addition to comparing direct sum distances ΣL(i), the times of transit t(i) for each of the unit routes (i) can be determined and added. That is, the average velocities v for different types of unit routes (i) are used to determine the times t(i) required for transit through the unit routes (i), using the equation $$t(i)=L(i)/v \quad (3)$$

and these are added for the respective routes to determine, as the shortest route, the route for which the value of Σt(i) is minimum. Accident information, construction information, road closings and similar can for example be stored as point information, as indicated by the x symbols shown in the unit route (22). When a symbol x is used to denote a road closing on the unit route (22), for example, the distance or time can be set to L(22)=∞ or t(22)=∞, and the prescribed values input as dummy values. Also, the unit route (22) may be deleted.

Such route searches are also performed between the interchange C and the ending position E. From the interchange A to the interchange C, travel is on a highway. At this time, congestion information between A and B and between B and C can be taken into account in the above equations (1) and (2) to obtain the congestion distances L(i), and equation (3) can be used to obtain the time of transit t(i).

In the above-described route searches, not only the shortest routes (routes with the minimum values of ΣL(i) and Σt(i)), but a plurality of routes, in order with the smallest congestion distances ΣL(i) and transit times Σt(i), can be searched selectively. Also, using equation (3) the estimated arrival time (current time+Σt(i)) can be calculated in addition to the required times t(i) (t(i)=L(i)/v) for each route and unit route (i). Further, routes which do not use toll roads (highways), or routes which give priority to toll roads (highways), can be searched, according to whether toll roads are or are not to be used.

Road information (courses (routes), distances, times (transit times, arrival times and similar)) transmitted to the terminals 20*a* to 20*c* are generated in response to requests from the terminals 20*a* to 20*c*. That is, under the above-described conditions, road information can be generated based on congested road network descriptions. Road information generated in this way is stored in the road information DB 18*a* (step 302-2).

Road information thus generated and stored is provided to the terminal devices 20*a* to 20*c* (step 303-1). At this time, the timing of provision may be immediately after generation of the road information, or information may be provided in response to requests from the terminal devices 20*a* to 20*c*.

When there is a road information update request from a terminal device 20*a* to 20*c* (step 303-2), processing may be repeated from step 302-1.

In the above, a road information provision server, road information provision system, and road information provision method of this invention have been explained; but the above-described processing of steps 301, 302 and 303 can be performed independently. That is, during the road information generation of step 302 and during the road information provision of step 303, the congested road network description generation and storage (updating) of step 301 can be performed.

Next, a route search server, route search system and route search method of this invention are explained.

The example of the mode of use of the route search system of the invention is similar to that of the above FIG. 1.

Figure 7:
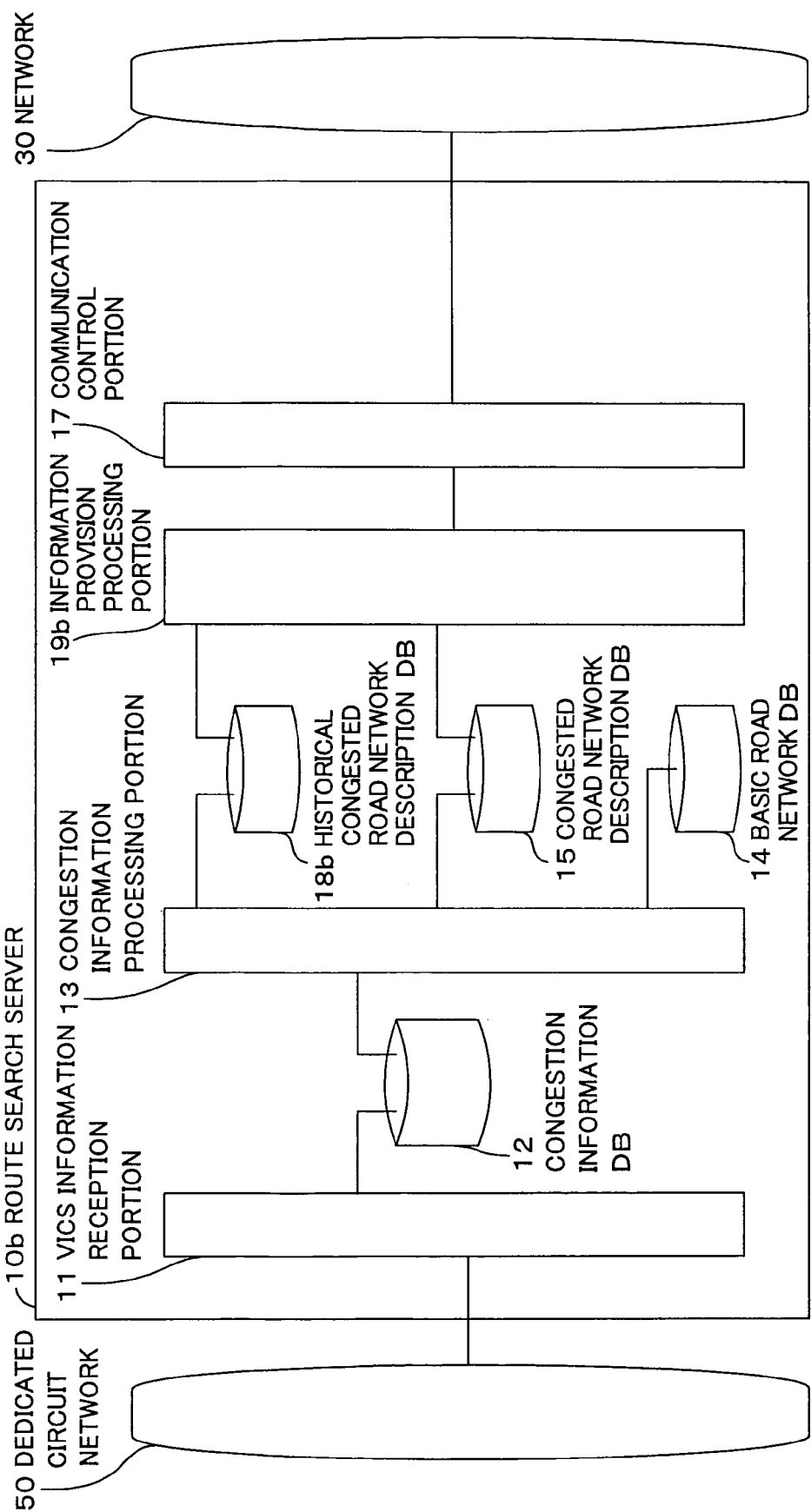
FIG. 7 shows an example of the form of a route search server of this invention.

FIG. 7 shows an example of the form of a route search server 10*b* of this invention. In FIG. 7, the route search server 10*b* comprises a VICS information reception portion 11, which receives congestion information with prescribed timing (for example, in 5 minute intervals) from the VICS center 40 (FIG. 1) via the dedicated circuit network 50; a congestion information DB (database) 12, which stores congestion information received by the VICS information reception portion 11; a basic road network DB 14, which stores, for each prescribed unit route (i), the route type, basic distance L0(i), average velocities v for each route type, and other road network information; a congestion information processing portion 13, which, based on road network information stored in the basic road network DB 14 and on congestion information stored in the congestion information DB 12, generates the latest congested road network description (the most recent congested road network description) with the timing of a congestion information update or with different timing; a congested road network description DB 15, which stores the latest congested road network description generated by the congestion information processing portion 13; a historical congested road network description DB 18*b*, which stores past congested road network descriptions (historical congested road network descriptions) generated by the congestion information processing portion 13; an information provision processing portion 19*b*, which, based on specified route information, performs route searches of roads from congested road network descriptions stored in the congested road network description DB 15 or in the historical congested road network description DB 18*b*, generates route information comprising text information, map information or similar, and provides this route information; and, a communication control portion 17, which performs communication with the terminal devices 20*a*, 20*b* via the network 30.

Here, route information includes information indicating the time at which the route information was generated; when time information is included in route specification information, the information provision processing portion 19*b* performs a route search of routes selecting the congested road network description for the time indicated by the time information from the congested road network description DB 15 or historical congested road network description DB 18*b*.

Based on the starting position information and ending position information specified by the terminal devices 20*a*, 20*b*, the information provision processing portion 19*b* can generate, as route information, the shortest route from congestion distances contained in congested road network descriptions, together with predicted times (required times, arrival time, and similar).

Traffic information provided by the Vehicle Information and Communication System (VICS) as congestion information is similar to that described above.

Next, an information provision method which uses the route search system and route search server 10*b* of this invention described in FIG. 1 and FIG. 7 is explained.

Figure 8:
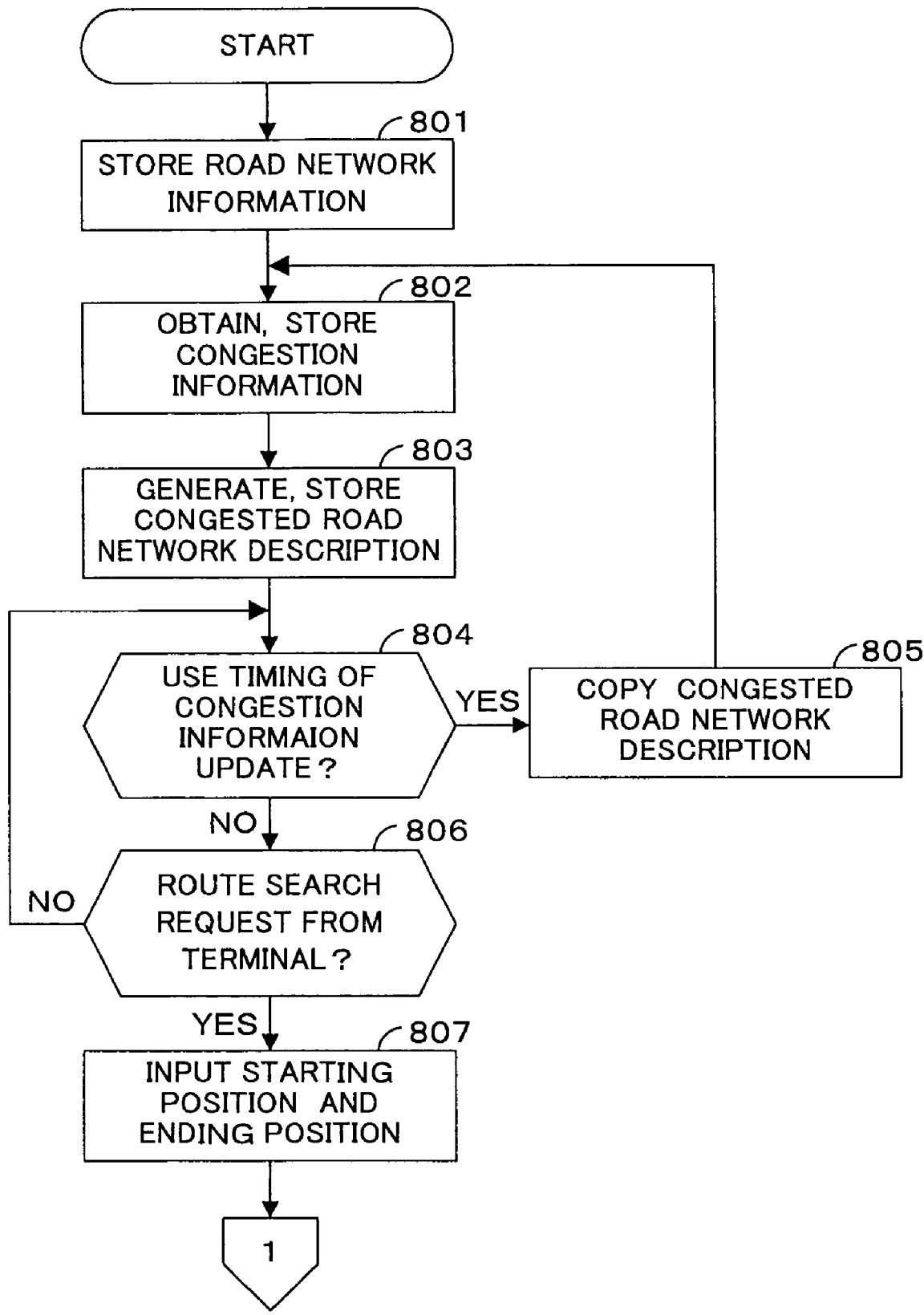
FIG. 8 is a flowchart showing a route search method of this invention.
Figure 9:
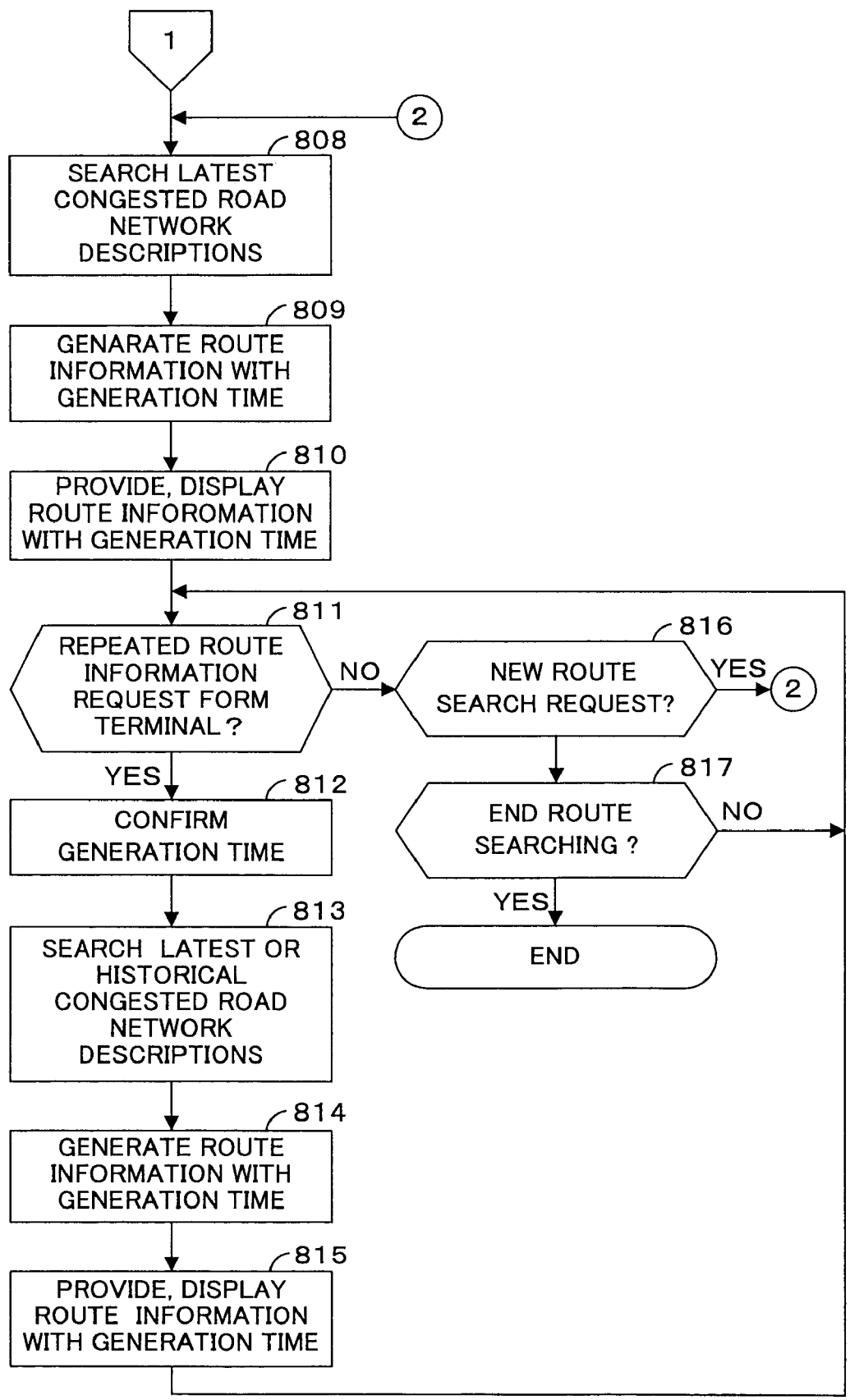
FIG. 9 is a flowchart showing a route search method of this invention.
Figure 10:
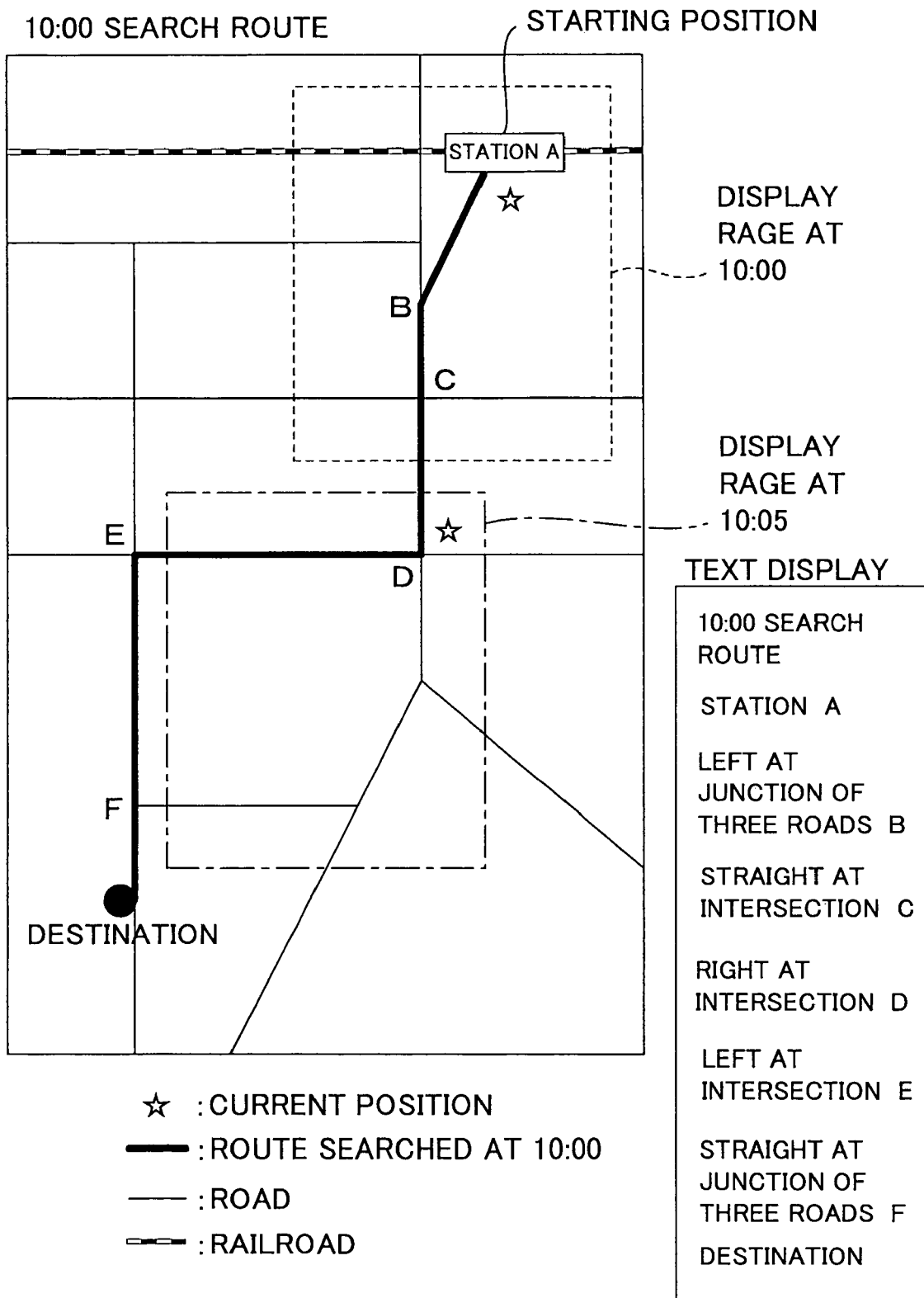
FIG. 10 shows route information in a route search system of this invention.
Figure 11:
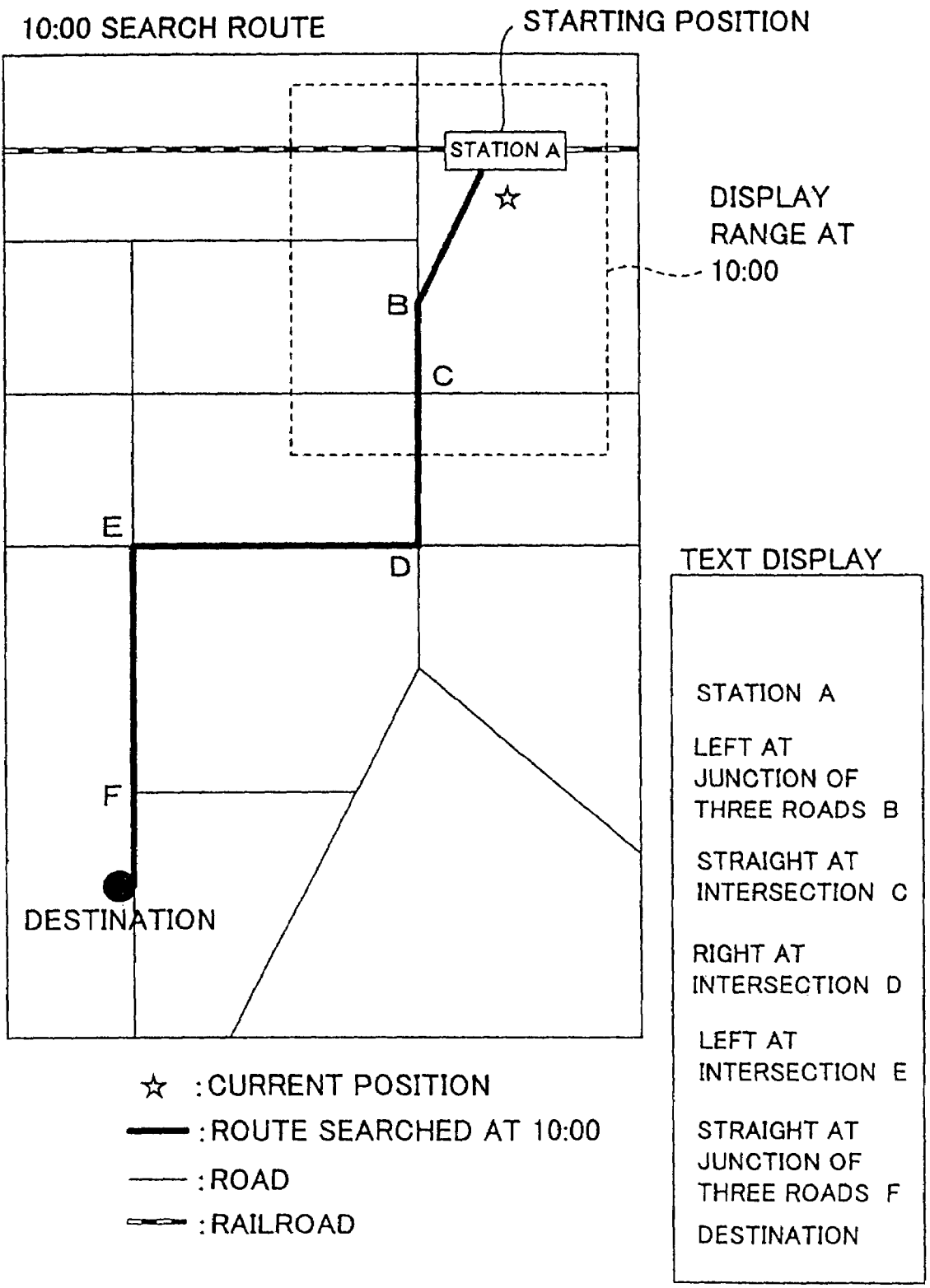
FIG. 11 shows search results for a case in which routes are searched in a conventional route search system; and, FIG. 12 shows search results for a case in which routes are searched in a conventional route search system.

FIG. 8 and FIG. 9 are flowcharts showing an information provision method using a route search system of this invention. FIG. 10 shows route information in a route search system of this invention. In FIG. 1 and in FIG. 8 through FIG. 10, according to the information provision method of this invention, first the route search server 10b stores the basic distances L0(i) and types for each unit route (i), as well as the average velocities v for each route type and other road network information in the basic road network DB 14 (step 801).

Then, congestion information (traffic information) is obtained from the VICS center 40 and stored in the congestion information DB 12 (step 802).

Next, the congestion information processing portion 13 generates a congested road network description, based on congestion information stored in the congestion information DB 12 and on road network information stored in the basic road network DB 14, and stores this in the congested road network description DB 15 (step 803).

As the method of generation of a congested road network description, a congested road network description can be generated by calculations using equations (equations (1) and (2)) similarly to the calculations in the above-described FIG. 4 and step 301-3.

The latest congested road network description generated in this way is stored in the congested road network description DB 15 together with the time of generation as the latest congested road network description (step 803).

Here, step 802 and step 803 can be performed with prescribed timing (for example, in 5 minute intervals), and as for example shown in FIG. 8, step 802 and step 803 can be performed with the timing of congestion information updating (step 804). By means of these steps 802 and 803, the latest congested road network description is updated. At this time, prior to the processing of step 802, the latest congested road network description currently stored in the congested road network description DB 15 is copied to the historical congested road network description DB 18b as a historical congested road network description (step 805). In FIG. 8, updating of the latest congested road network description is performed with the timing of congestion information updating; but updating of the latest congested road network description and updating of congestion information may be performed with different timing.

When there is a route search request from a terminal device 20a or 20b (step 806), a route input screen is displayed on the terminal 20a or 20b, and the starting position (departure point) and ending position (destination point) are input from the terminal 20a or 20b (step 807). Here, when the starting position (departure point) is the current point, current position information can be obtained from the GPS 60 and provided to the route search server 10b as the starting position (departure point).

When the starting position (departure point) and ending position (destination point) are input as route specification information (step 807), the information provision processing portion 19b searches the latest congested road network description of the congested road network description DB 15 (step 808), and generates route information (step 809). In the case of the first route search, the time information is the current time (10:00). Hence the route information includes, as time information, the time at which the route information was generated. The route information also includes the course and time calculated based on the congested road network description, and the course distance calculated based on the course and on road network information.

FIG. 10 shows route information generated in step 809. The route information generated in step 809 is provided to and displayed at the terminal device 20a or 20b (step 810). In FIG. 10, map information and text information at 10:00 are shown, when the starting position is station A and the ending position is the destination point. Here, text information indicates the route from station A to the destination; because intersections and similar serve as route guide points, the information "10:00 route search: station A→left at junction of three roads B→straight at intersection C→right at intersection D→left at intersection E→straight at junction of three roads F→destination" is displayed, as shown in FIG. 10.

On the other hand, in the map display, when the terminal is a portable telephone 20b or similar, the space of the display portion is limited, so that in some cases only a portion of the map can be displayed. In such cases, a map showing the route from the current position (indicated by a star) is displayed (displayable range indicated by the dashed lines).

Here, when the user advances to the vicinity of intersection D, the range of the map display is exceeded, and so a repeated search (map redisplay) is performed from the terminal side (step 811).

When a repeated search (map redisplay) is performed from the terminal side, the starting position (station A) and ending position (destination) stored in the terminal, as well as the time of generation of the route information currently displayed, are transmitted to the route search server 10b, and the time of generation (time information) is confirmed by the information provision processing portion 19b (step 812).

Based on the generation time (time information), the information provision processing portion 19b searches the latest congested road network descriptions in the contested road network DB 15 or the historical congested road network descriptions in the historical congested road network description DB 18b (step 813), and generates route information (step 814). At this time, the course and time are calculated based on the latest congested road network description or on a historical congested road network description, the course distance is calculated based on the calculated course and on road network information, and the course, distance and time are generated as route information.

Here the time information is not current time (10:05), but the time of generation of the latest route information (10:00). Hence this route information is the same as the route information generated at 10:00. The route information generated in step 814 is the same as the route information shown in FIG. 10, and as the text information, indicating the route from station A to the destination, "10:00 route search: station A→left at junction of three roads B→straight at intersection C →right at intersection D→left at intersection E→straight at junction of three roads F→destination" is displayed.

Figure 12:
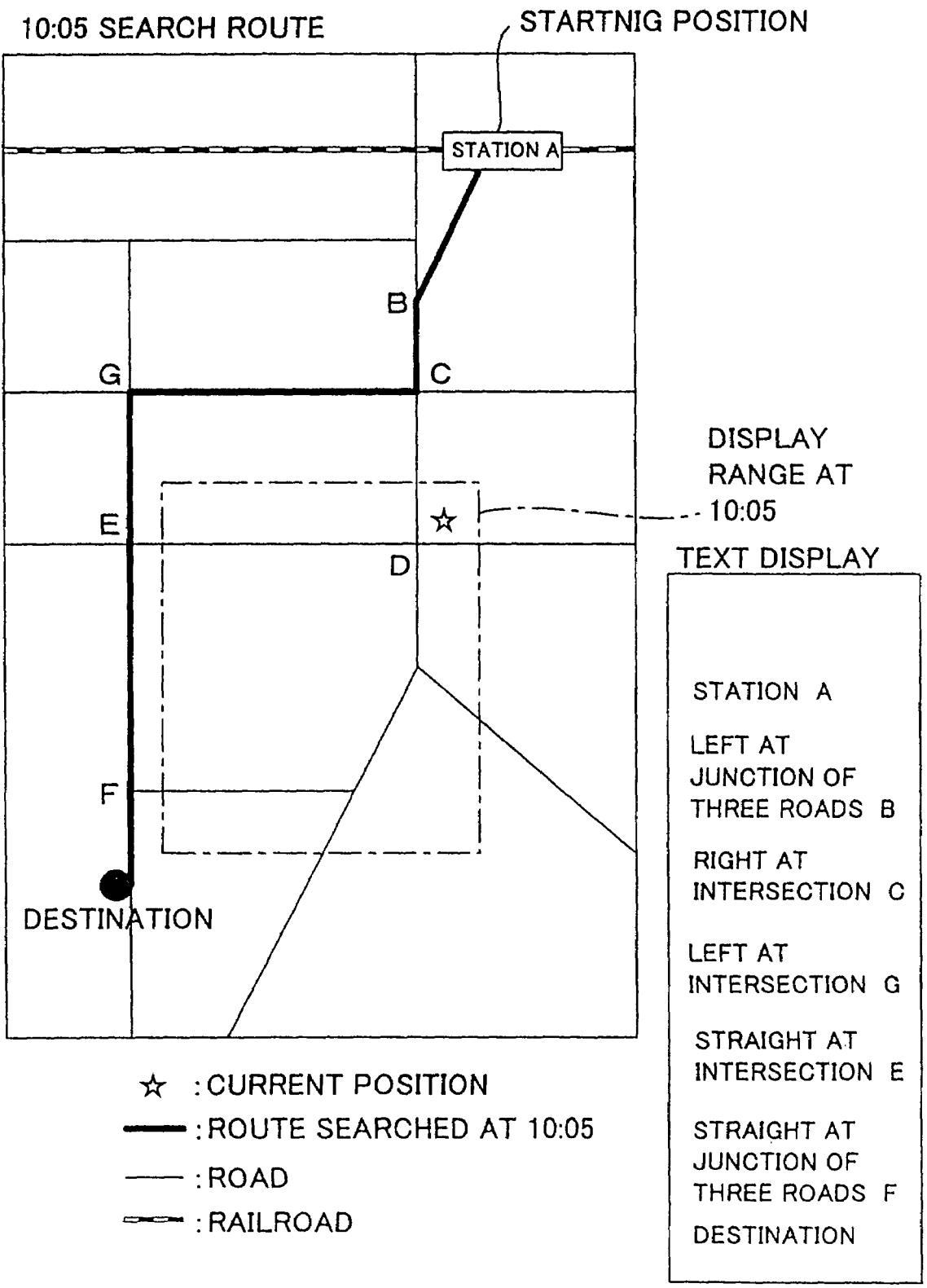

In the map display, the route from the current position (the star symbol in the vicinity of intersection D) is displayed (the range indicated by dashed lines). Consequently even if the latest congested road network description is updated due to updating of congestion information, the route information is generated using a historical congested road network description, so that no difficulties arise in route guidance due to changes in the route such as that shown in FIG. 12, and the route to the destination can be displayed from the current position (an intermediate position).

On the other hand, when there is a new route search request rather than the repeated request for route information in step 811 (step 816), processing is repeated from the above-described step 808. And when, instead of a repeated request for route information, or a new route search request (step 811, step 816), there is a request to end route searching (step 817), route search processing is ended. When there is no request to end route searching (step 817), a repeated request for route information (step 8-11), a new route search request (step 816), or a request to end route searching (step 817) is awaited.

In the above, a route search server, route search system, and route search method of this invention have been explained; however, the above-described processing of steps 801 to 805 can be performed independently of the processing of steps 806 and later.

INDUSTRIAL APPLICABILITY

As described above, by means of a road information provision server, road information provision system, and road information provision method of this invention, congestion information can be collected and managed in a unified manner, congested road network descriptions can be generated for all roads, and road information can be generated in response to user requests for relevant (specified) routes based on these congested road network descriptions, so that even when routes are specified (by specifying a starting position and ending position, for example) extending over a broad range (long-distance interval), information for the shortest route, in terms of either distance or time, as well as congestion information and other road information can be determined accurately and rapidly.

Further, by means of a route search server, route search system, and route search method of this invention, time information for the time of generation of route information is added to the route information of search results, so that route information at the relevant time can be obtained in the event of a repeated search of the same route; consequently the same route information can be provided even in cases of a repeated search of the same route at a different time, without managing search results by user on the server side.

The invention claimed is:

1. A route search server for performing road route searches, comprising:

basic road network storage means for storing road network information;

congestion information storage means for storing congestion information;

congestion information processing means for generating congested road network descriptions with prescribed timing based on said road network information stored in said basic road network storage means and on congestion information stored in said congestion information storage means;

historical congested road network description storage means for storing the latest congested road network description among said congested road network descriptions generated by said congestion information processing means;

historical congested road network description storage means for storing past congested road network descriptions among said congested road network descriptions generated by said congestion information processing means; and, information provision processing means for generating route information by searching road routes from said congested road network descriptions stored by said congested road network description storage means or by said historical congested road network description storage means and from said road network information stored by said basic road network storage means based on route specification information, and providing the route information, wherein said route information includes time information indicating the time of generation of the route information, and, when said time information is included by said route specification information, said information provision processing means selects said congested road network description at the time indicated by said time information from said congested road network description storage means or from said historical congested road network description storage means, and performs a road route search from the selected congested road network description and from said road network information stored in said basic road network storage means.

2. The route search server according to claim 1, wherein said information provision processing means generates said route information using map information and text information.

3. The route search server according to claim 1, wherein said information provision processing means generates, as route information, the shortest route, in terms of either distance or time, from said congested road network description, based on said route specification information.

4. The route search server according to claim 1, wherein, when congestion information stored in said congestion information storage means is indicated by travel times $t(i)$ for unit routes (i), said congestion information processing means uses average velocities v for each route type to calculate the congestion distances $L(i)$ for each unit route (i) comprised by a congested road network description according to the equation $$L(i)=v \cdot t(i)$$

and generates a congested road network description.

5. The route search server according to claim 1, wherein said congestion information processing means calculates congestion distances $L(i)$ for each unit route (i) comprised by a congested road network description, based on the basic distances $L0(i)$ of each unit route (i) of said road network information stored in said basic road network storage means and on the distances x and/or y of congestion and/or slowdown in each of said unit routes (i) comprised by said congestion information stored in said congestion information storage means, according to the equation $$L(i)=(L0(i)-x-y)+\alpha x+\beta y$$

where $\alpha$ is a weighting factor (>1) for congestion, and $\beta$ is a weighting factor (>1) for traffic slowdowns, and generates a congested road network description.

6. A route search system, comprising:

a terminal device for specifying routes and requests road information;

a congestion information center for providing congestion information; and, a route search server for generating route information based on said congestion information from said congestion information center in response to a request from said terminal device and providing said route information to said terminal device, wherein said route search server is the route search server according to claim 1.

7. The route search system according to claim 6, wherein said terminal device obtains current position information from a GPS (Global Positioning System), and uses said current position as the starting position of a specified route.

8. A route search method of providing route information for a specified route, the method comprising the steps of:

(A) storing the basic distance $L0(i)$ and type of each unit route (i), as well as the average velocity v for each route type, as road network information;

(B) obtaining and storing congestion information with prescribed timing;

(C) generating the latest congested road network description based on said road network information and on said congestion information, with the same or different timing as step (B);

(D) storing currently stored congested road network descriptions as historical congested road network descriptions, and updating by said latest congested road network description;

(E) calculating the course and time based on said latest congested road network description or said historical congested road network descriptions in response to a route search request, and calculating the distance of said course based on said calculated course and on said road network information, and generating the course, distance and time as route information; and, (F) adding time information indicating the time at which the route information was generated to said generated route information, and providing said route information.

9. The route search method according to claim 8, wherein, in said step (E), when time information is comprised by a route search request, the congested road network description at the time indicated by said time information is selected from said latest congested road network descriptions or from said historical congested road network descriptions, and route searching is performed.

10. The route search method according to claim 8, wherein, in said step (B), travel times t(i) for each unit route (i) are obtained and stored as congestion information, and that in said step (C), average velocities for each route type are used to calculate congestion distances L(i) for each unit route (i) comprised by the congested road network description according to the equation $$L(i)=v \cdot t(i)$$

and the congested road network description is generated.

11. The route search method according to claim 8, wherein, in said step (B), distances x and/or y of congestion and/or slowdown for each unit route (i) are obtained and stored as congestion information, and that in said step (C), congestion distances L(i) are calculated for each unit route (i), based on basic distances L0(i) for each unit route (i) of said road network information and on distances x and/or y of congestion and/or slowdown for said unit routes (i) comprised by said congestion information, according to the equation $$L(i)=(L0(i)-x-y)+\alpha x+\beta y$$

where $\alpha$ is a weighting factor (>1) for congestion, and $\beta$ is a weighting factor (>1) for traffic slowdowns, and a congested road network description is generated.

* * * * *

UNITED STATES PATENT AND TRADEMARK OFFICE
CERTIFICATE OF CORRECTION

PATENT NO. : 7,418,338 B2 Page 1 of 1
APPLICATION NO. : 10/529145
DATED : August 26, 2008
INVENTOR(S) : Keisuke Onishi et al.

It is certified that error appears in the above-identified patent and that said Letters Patent is hereby corrected as shown below:

On Title Page, insert item

--[30] Foreign Application Priority Data

December 24, 2002 [JP] Japan..........................................................2002-371482
December 24, 2002 [JP] Japan..........................................................2002-371483--

Signed and Sealed this

Twenty-third Day of December, 2008

JON W. DUDAS
*Director of the United States Patent and Trademark Office*